(12) United States Patent
Farahat

(10) Patent No.: US 9,834,892 B2
(45) Date of Patent: Dec. 5, 2017

(54) PNEUMATIC ROADWAY ENERGY RECOVERY SYSTEM

(71) Applicant: KING FAHD UNIVERSITY OF PETROLEUM AND MINERALS, Dhahran (SA)

(72) Inventor: Ashraf Mohamed Samir Farahat, Kelowna (CA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 36 days.

(21) Appl. No.: 14/930,511

(22) Filed: Nov. 2, 2015

(65) Prior Publication Data

US 2016/0053441 A1 Feb. 25, 2016

Related U.S. Application Data

(63) Continuation-in-part of application No. 14/022,211, filed on Sep. 9, 2013, now abandoned.

(51) Int. Cl.
| | |
|---|---|
| *E01C 1/00* | (2006.01) |
| *F04B 45/04* | (2006.01) |
| *F03G 7/08* | (2006.01) |
| *F02C 1/02* | (2006.01) |
| *H02K 7/18* | (2006.01) |

(Continued)

(52) U.S. Cl.
CPC ................ *E01C 1/00* (2013.01); *A62B 29/00* (2013.01); *F02C 1/02* (2013.01); *F03G 7/08* (2013.01); *F04B 41/02* (2013.01); *F04B 43/0045* (2013.01); *F04B 45/043* (2013.01); *H02K 7/1823* (2013.01); *B60S 3/04* (2013.01); *H02K 7/1853* (2013.01)

(58) Field of Classification Search
CPC ........ E01C 1/00; F04B 43/0045; F04B 41/02; F04B 45/043; A62B 29/00; F03G 7/08; F02C 1/02; H02K 7/1823
USPC ......................................................... 290/1 R
See application file for complete search history.

(56) References Cited

U.S. PATENT DOCUMENTS

| | | |
|---|---|---|
| 4,081,224 A | 3/1978 | Krupp |
| 4,212,598 A | 7/1980 | Roche et al. |

(Continued)

FOREIGN PATENT DOCUMENTS

CN 201090385 Y 7/2008

*Primary Examiner* — Viet Nguyen
(74) *Attorney, Agent, or Firm* — Oblon, McClelland, Maier & Neustadt, L.L.P.

(57) ABSTRACT

The pneumatic roadway energy recovery system generates power from the weight of vehicles, pedestrians and the like traveling on a roadway surface. The pneumatic roadway energy recovery system includes a plurality of pneumatic pumps in fluid communication with one another and that are arrayed beneath a roadway surface. The pneumatic pumps are in fluid communication with a storage tank. The vehicles, pedestrians and the like traveling on the roadway surface compress the plurality of pneumatic pumps as they pass over the pumps, generating pressurized air, which is received by and stored in the storage tank. Preferably, a turbine, such as a Pelton wheel or the like, is in fluid communication with the storage tank. Selective release of the pressurized air in the storage tank drives the turbine, which, in turn, is connected to an electrical generator for generating usable electrical power.

3 Claims, 5 Drawing Sheets

(51) Int. Cl.
*A62B 29/00* (2006.01)
*F04B 41/02* (2006.01)
*F04B 43/00* (2006.01)
*B60S 3/04* (2006.01)

(56) References Cited

U.S. PATENT DOCUMENTS

| | | | |
|---|---|---|---|
| 4,322,673 A | 3/1982 | Dukess | |
| 4,409,489 A * | 10/1983 | Hayes | F03G 7/08 290/1 R |
| 4,437,015 A * | 3/1984 | Rosenblum | F03G 7/08 290/1 R |
| 5,355,674 A * | 10/1994 | Rosenberg | F03G 3/00 290/1 R |
| 5,634,774 A | 6/1997 | Angel et al. | |
| 7,239,031 B2 | 7/2007 | Ricketts | |
| 8,232,661 B2 * | 7/2012 | Cannarella | F03B 13/148 290/1 R |
| 2002/0089309 A1 * | 7/2002 | Kenney | H02K 7/1853 322/1 |
| 2003/0132636 A1 | 7/2003 | Ricketts | |
| 2004/0130158 A1 | 7/2004 | Kenney | |
| 2006/0119102 A1 | 6/2006 | Hershey et al. | |
| 2008/0063472 A1 | 3/2008 | Hickman | |
| 2008/0224477 A1 * | 9/2008 | Kenney | F01D 17/26 290/1 R |
| 2010/0072758 A1 * | 3/2010 | Chang | H02K 7/1853 290/1 R |
| 2011/0215593 A1 * | 9/2011 | Chang | H02K 99/00 290/1 R |
| 2011/0278861 A1 * | 11/2011 | Yoon | F03B 13/24 290/1 R |
| 2014/0203643 A1 * | 7/2014 | Maeda | H02J 17/00 307/43 |
| 2015/0069757 A1 * | 3/2015 | Farahat | F03G 7/08 290/52 |
| 2015/0361967 A1 * | 12/2015 | Gallelli | F03G 7/08 60/530 |

* cited by examiner

PNEUMATIC ROADWAY ENERGY RECOVERY SYSTEM

CROSS-REFERENCE TO RELATED APPLICATION

This application is a continuation-in-part of U.S. patent application Ser. No. 14/022,211, filed on Sep. 9, 2013.

BACKGROUND OF THE INVENTION

1. Field of the Invention

The present invention relates generally to power generation, and particularly to a pneumatic roadway energy recovery system.

2. Description of the Related Art

With the present focus on development of alternative energy sources and conservation of energy and natural resources, many avenues are being explored to tap unused energy sources. In this vein, attempts have been made to harness the large amount of energy dissipated every day by the wheels of vehicles as they move along roadway surfaces. Efforts to utilize the force developed between vehicle wheels and roadway surfaces in the generation of compressed air (or other compressed gas) have been made.

Such systems, however, are known to suffer from a number of design flaws. Known systems are typically mechanical in nature, making use of elastic elements and the like, which are easily broken, worn out or become misaligned under the stress and strain of passing traffic. Further, many such systems are integrated with the roadway so that they cannot be readily removed for replacement or repair. Additionally, it is common in such systems to further protrude appreciably from the roadway surface so as to impede traffic and interfere with motor vehicle safety.

Thus, a pneumatic roadway energy recovery system solving the aforementioned problems is desired.

SUMMARY OF THE INVENTION

The pneumatic roadway energy recovery system is a system for generating power from the weight of vehicles, pedestrians and the like traveling on a roadway surface. The pneumatic roadway energy recovery system includes a plurality of pneumatic pumps in fluid communication with one another that are arrayed beneath a roadway surface. The plurality of pneumatic pumps are further in fluid communication with a storage tank. The vehicles, pedestrians and the like traveling on the roadway surface compress the plurality of pneumatic pumps as they pass over the pumps, generating pressurized air, which is received by, and stored in, the storage tank.

Preferably, a turbine, such as a Pelton wheel or the like, is in fluid communication with the storage tank. Selective release of the pressurized air in the storage tank drives the turbine, which, in turn, is connected to an electrical generator for generating usable electrical power.

In an alternative embodiment, the storage tank receives both the pressurized air, as well as water. The storage tank is provided with a water inlet for selectively receiving the water. The storage tank further has a water outlet for selectively releasing the water from the storage tank. The water outlet is in fluid communication with a spray nozzle for selectively spraying the water released from the storage tank. As vehicles travel on the roadway surface, the pneumatic pumps generate pressurized air, and the storage tank receives and stores the pressurized air for pressurizing the water received therein. The water may then be selectively released from the storage tank, under pressure, for cooling people or animals on a sidewalk adjacent the roadway, for washing vehicles, to aid in the removal of aerosols and pollution produced by the vehicles, or for any other desired purpose.

These and other features of the present invention will become readily apparent upon further review of the following specification.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
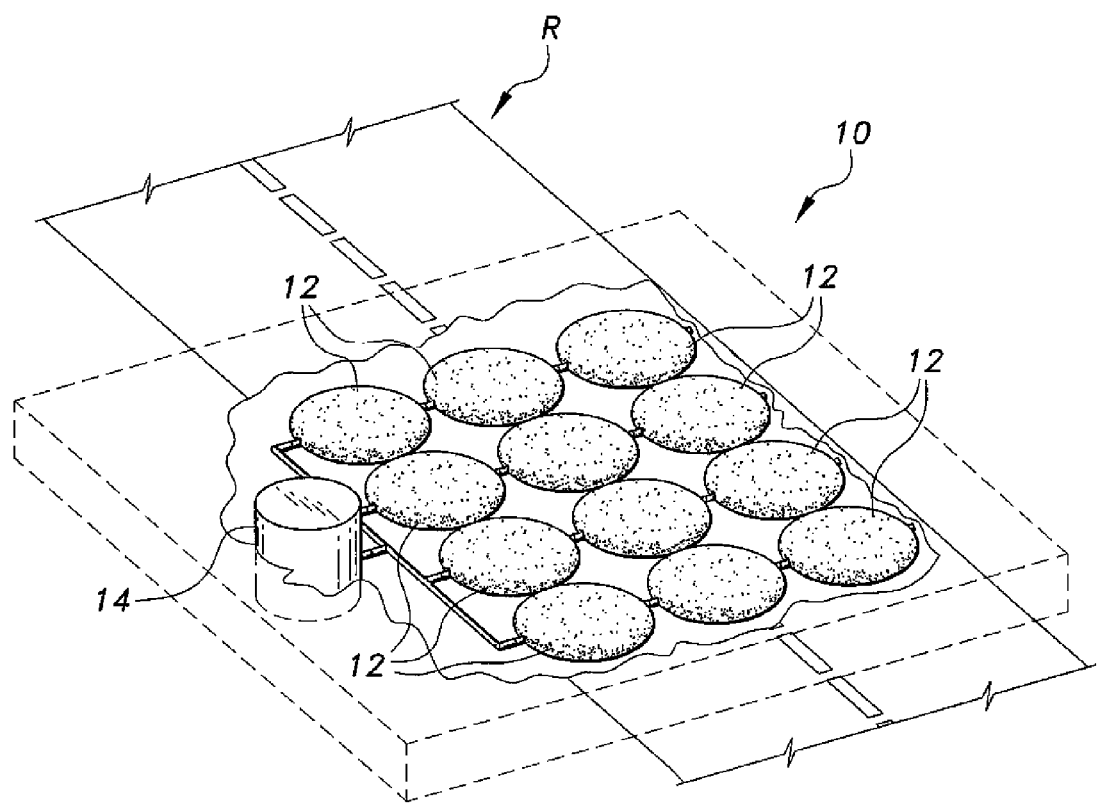
FIG. 1 is a diagrammatic environmental, perspective view of a pneumatic roadway energy recovery system according to the present invention, the roadway being broken away to show the pneumatic system.

As best shown in FIG. 1, the pneumatic roadway energy recovery system 10 is a system for generating power from the weight of vehicles, pedestrians and the like traveling on a roadway surface. It should be understood that the roadway surface R in FIG. 1 is shown for exemplary purposes only, and that the system 10 may be used in combination with any suitable type of road, sidewalk, path or the like. The pneumatic roadway energy recovery system 10 includes a plurality of pneumatic pumps 12 in fluid communication with one another that are arrayed beneath the roadway surface R. The plurality of pneumatic pumps 12 are further in fluid communication with a storage tank 14. In operation, vehicles, pedestrians and the like traveling on the roadway surface R compress the plurality of pneumatic pumps 12 as they pass over the pumps 12, generating pressurized air, which is received by and stored in the storage tank 14. It should be understood that the plurality of pneumatic pumps 12 may be buried or embedded in or under the roadway surface R at any suitable depth, preferably at a depth that allows the pneumatic pumps 12 to be readily compressed by vehicle weight, but without detracting from the mechanical integrity of the roadway surface R.

Figure 2:
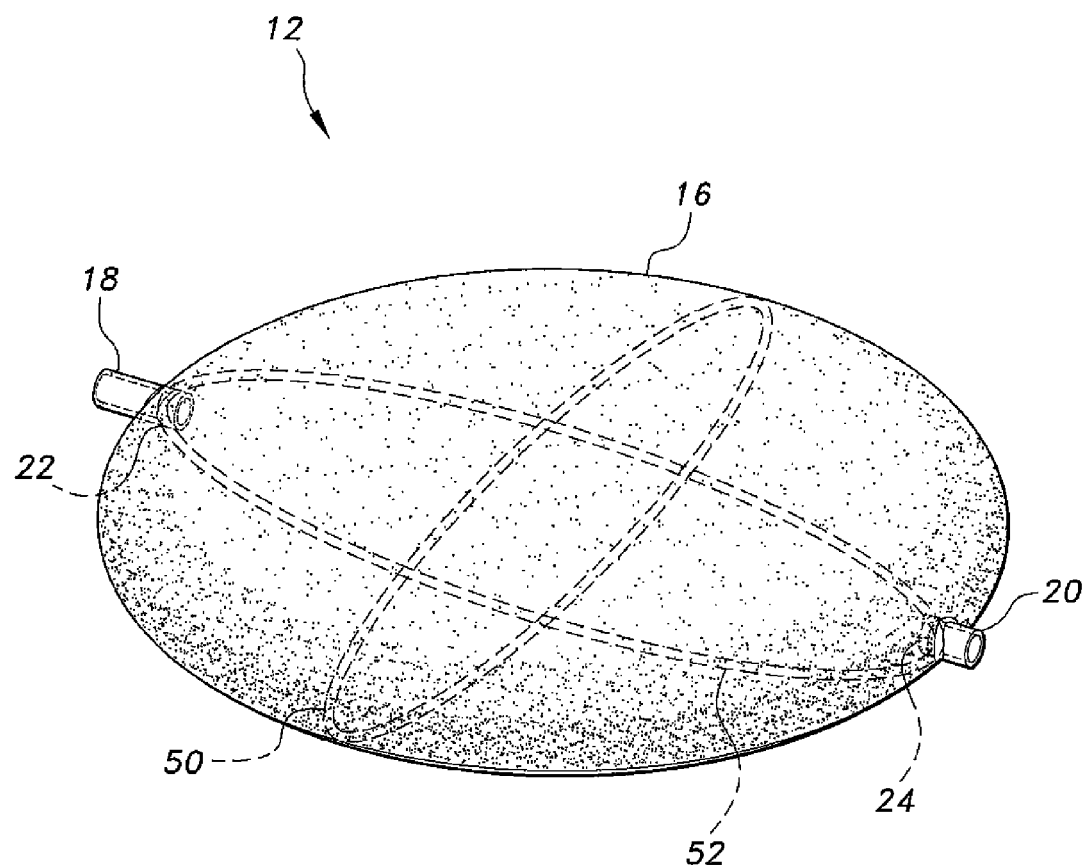
FIG. 2 is a perspective view of a pneumatic pump of the pneumatic roadway energy recovery system of FIG. 1.

FIG. 2 illustrates a single of one of the pneumatic pumps 12. Preferably, each of the pneumatic pumps 12 is substantially identical. As shown, each pneumatic pump may be in the form of a flexible bladder 16 having an air inlet 18 and an air outlet 20. It should be understood that any suitable type of pneumatic pump may be utilized, and that the pneumatic pump 12 shown in FIG. 2 is shown for exemplary purposes only. Preferably, the air inlet 18 is selectively sealed by a one-way valve 22. Similarly, the air outlet 20 is also preferably sealed by a one-way valve 24.

In FIG. 2, the pneumatic pump 12 is shown as having a substantially elliptical cross section. It should be understood that the bladder 16 of the pneumatic pump 12 may have any desired dimensions or configuration. Exemplary dimensions for the elliptical pump 12 of FIG. 2 are a length of about 300 cm along the major elliptical axis, a length of about 200 cm along the minor elliptical axis, and a height of about 0.5 cm. As shown, the pneumatic pump may include a pair of orthogonal spring steel frames 50, 52, each having a substantially elliptical configuration, and which are covered by rubber or the like.

Figure 3:
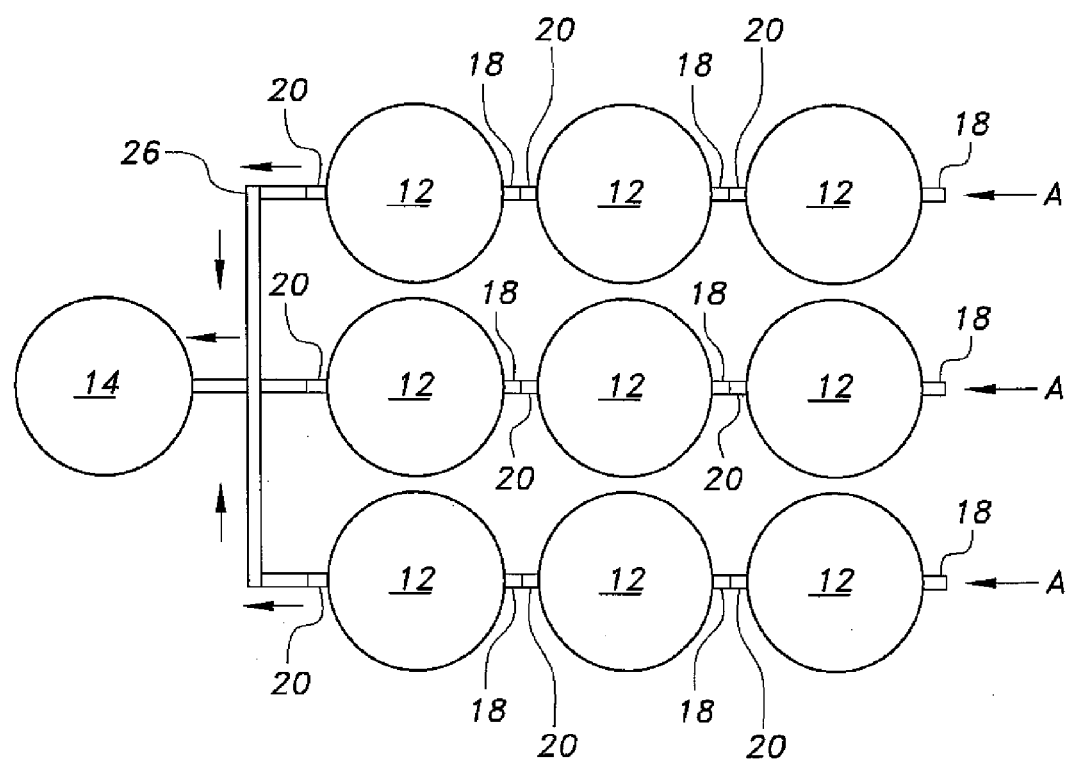
FIG. 3 is a diagram illustrating airflow through the pneumatic roadway energy recovery system according to the present invention.

As shown in FIG. 3, the plurality of pneumatic pumps 12 are preferably arrayed in rows, such that the air outlet 20 of each pneumatic pump 12 is in fluid communication with the air inlet 18 of an adjacent one of the pneumatic pumps 12, being attached directly to each other or connected by pipes or other conduit. The pneumatic pumps 12 on the open end of the system 10 (on the right-hand side in the exemplary orientation of FIG. 3) are positioned with no corresponding pumps 12 on their inlet sides, thus allowing environmental air A to enter through their air inlets 18. Similarly, pneumatic pumps 12 on the closed end of system 10 (on the left-hand side in the exemplary orientation of FIG. 3) are positioned with no corresponding pumps 12 on their outlet sides. The outlets 20 on the closed side feed into a pipe or tube manifold 26, which feeds into the storage tank 14. It should be understood that the storage tank 14 is shown for exemplary purposes only. The storage tank 14 may have any desired dimensions or configuration, and the singular exemplary tank 14 may be replaced by a plurality of storage tanks. Further, the storage tank 14 may be removable and replaceable.

Figure 4:
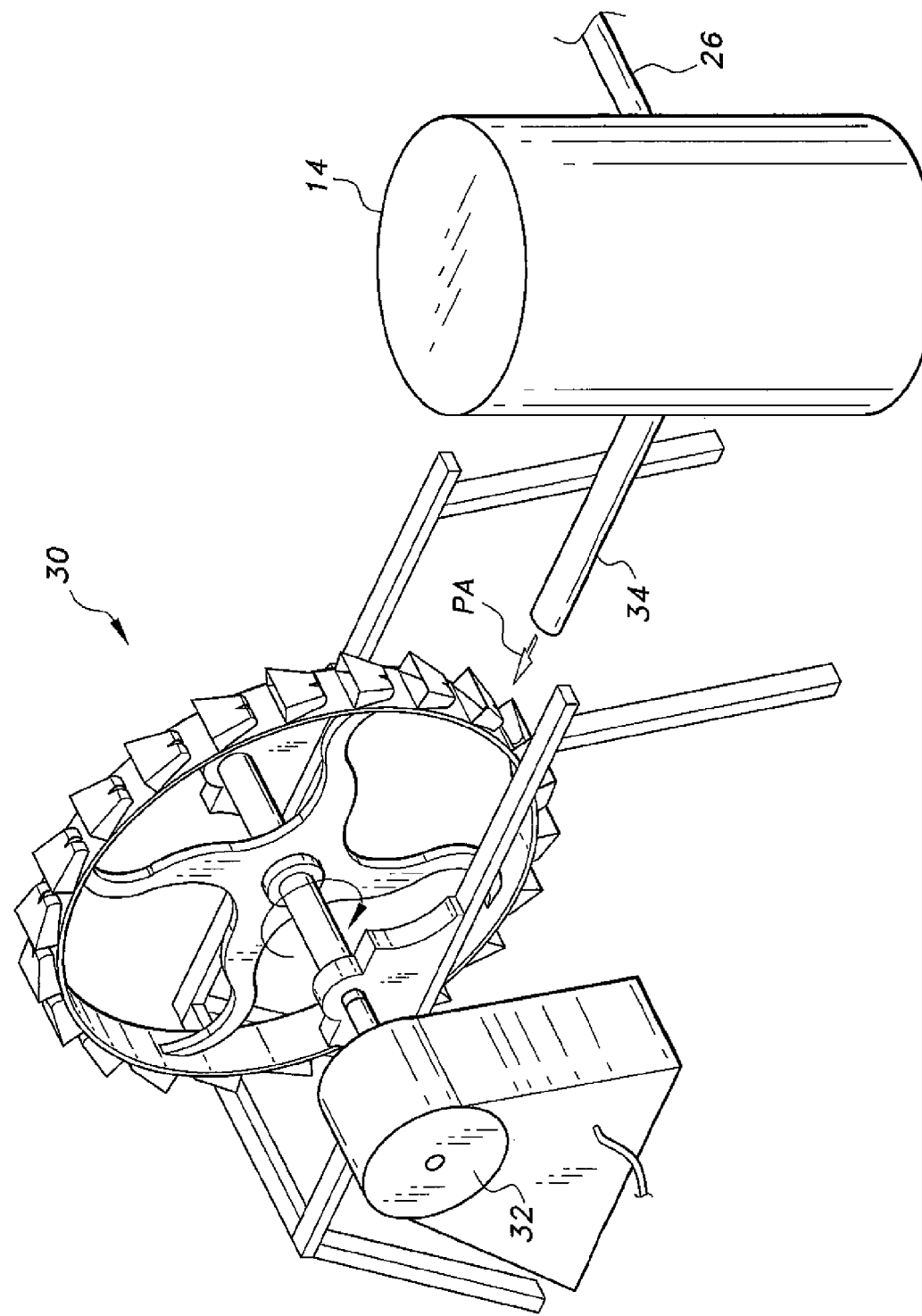
FIG. 4 is a perspective view of a turbine and electrical generator for an alternative embodiment of a pneumatic roadway energy recovery system according to the present invention.

FIG. 4 illustrates an alternative embodiment in which a valved pipe 34 or the like is used to selectively release pressurized air PA from within storage tank 14. The pressurized air PA is used to drive a turbine 30 (shown in FIG. 4 as a Pelton wheel, although it should be understood that any suitable type of turbine may be utilized). Selective release of the pressurized air PA from the storage tank 14 drives the turbine 30, which, in turn, is connected to an electrical generator 32 for generating usable electrical power. It should be understood that the electrical generator 32 may be any suitable type of generator, such as a conventional rotor-stator electromagnetic generator or the like. It should be understood that the valved pipe 34 is shown for exemplary purposes only, and that any suitable type of conduit may be utilized. Similarly, any suitable type of attachment for pipe or conduit 34 may be further utilized, such as a convergent-divergent nozzle or the like.

Figure 5:
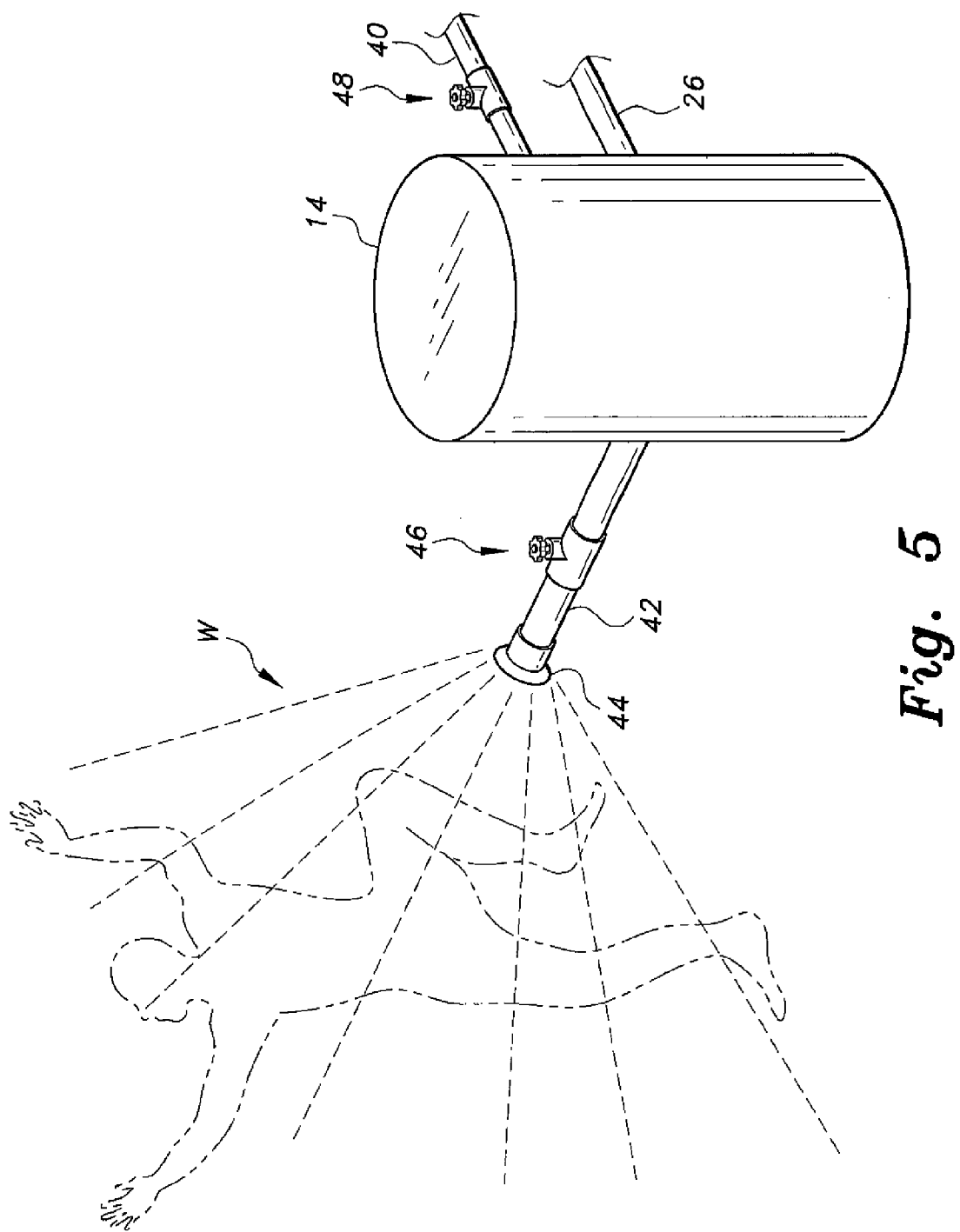
FIG. 5 is a perspective view of a storage tank in an alternative embodiment of the pneumatic roadway energy recovery system according to the present invention having a water sprayer.

FIG. 5 shows a further alternative embodiment in which the storage tank 14, in addition to receiving pressurized air through pipe or tube manifold 26, also receives water through an inlet 40. The volume and rate of water flowing through inlet 40 into the storage tank 14 may be selectively controlled by a conventional valve 48, which may be any suitable type of valve. The pressurized air is used to force the water in the storage tank 14, under pressure, through an outlet 42, which terminates in a spray nozzle 44. The volume and rate of water flowing through outlet 42 and the attached spray nozzle 44 may be selectively controlled by a conventional valve 46, which may be any suitable type of valve. The sprayed water W may be used for cooling people or animals on a sidewalk adjacent the roadway R, for washing vehicles, to aid in the removal of aerosols and pollution produced by vehicles traveling on roadway R, or for any other desired purpose.

It is to be understood that the present invention is not limited to the embodiments described above, but encompasses any and all embodiments within the scope of the following claims.

I claim:

1. A pneumatic roadway energy recovery system, comprising:
    a plurality of pneumatic pumps in fluid communication with one another, the pumps being arrayed beneath a roadway surface in a plurality of aligned linear sets, each of the pneumatic pumps being a flexible bladder having an air inlet and an air outlet, each of the linear sets having a first end pneumatic pump, a second end pneumatic pump and at least one intermediate pneumatic pump between the first end pneumatic pump and the second end pneumatic pump, the air outlet of each of the second end pneumatic pumps and the at least one intermediate pumps being in fluid communication with the air inlet of an adjacent one of the pneumatic pumps in the same linear set, each of the pneumatic pumps further having first and second one-way valves, the first one-way valve being disposed in the air inlet for selectively sealing the air inlet, the second one-way valve being disposed in the air outlet for selectively sealing the air outlet;
    a storage tank in fluid communication with each of the first end pneumatic pumps of each of the linear sets of pneumatic pumps, the storage tank further having a water inlet for selectively receiving water and a water outlet for selectively releasing the water from the storage tank; and
    a spray nozzle disposed on the water outlet for selectively spraying the water released from the storage tank;
    wherein vehicles traveling on the roadway surface cause the plurality of pneumatic pumps to generate pressurized air, the storage tank receiving and storing the pressurized air for pressurizing the water received therein so that the water released from the storage tank is selectively released under pressure.

2. The pneumatic roadway energy recovery system as recited in claim 1, further comprising a water inlet valve connected to the water inlet of said storage tank for selectively controlling the water being received by said storage tank.

3. The pneumatic roadway energy recovery system as recited in claim 2, further comprising a water outlet valve connected to the water outlet of said storage tank for selectively controlling the water being released by said storage tank.

* * * * *